(12) United States Patent
Buck et al.

(10) Patent No.: US 12,123,450 B2
(45) Date of Patent: Oct. 22, 2024

(54) ANCHORING DEVICE

(71) Applicant: Robert Bosch GmbH, Stuttgart (DE)

(72) Inventors: Thomas Buck, Tamm (DE); Stefano Delfini, Bettlach (CH); Wolfgang Pleuger, Zuchwil (CH); Gerd Scheying, Stuttgart (DE); Tjalf Pirk, Stuttgart (DE); Joachim Loeblein, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 17/632,537

(22) PCT Filed: Jul. 24, 2020

(86) PCT No.: PCT/EP2020/070961
§ 371 (c)(1),
(2) Date: Feb. 3, 2022

(87) PCT Pub. No.: WO2021/023524
PCT Pub. Date: Feb. 11, 2021

(65) Prior Publication Data
US 2022/0282748 A1    Sep. 8, 2022

(30) Foreign Application Priority Data

Aug. 7, 2019  (DE) ............... 10 2019 211 867.4

(51) Int. Cl.
*F16B 31/02*   (2006.01)
*F16B 13/06*   (2006.01)

(52) U.S. Cl.
CPC .......... *F16B 31/028* (2013.01); *F16B 13/065* (2013.01); *F16B 2200/95* (2023.08)

(58) Field of Classification Search
CPC .. F16B 31/028; F16B 13/065; F16B 2200/95; F16B 13/063; H04Q 2209/40;
(Continued)

(56) References Cited

U.S. PATENT DOCUMENTS 9,483,674 B1 * 11/2016 Fink ............... G06K 7/10366
10,904,644 B2 * 1/2021 White .................. G01D 21/00
(Continued)

FOREIGN PATENT DOCUMENTS

CN   1122908 A   5/1996
CN   1182526 A   5/1998
(Continued)

OTHER PUBLICATIONS

International Search Report corresponding to PCT Application No. PCT/EP2020/070961, mailed Sep. 24, 2020 German and English language document) (6 pages).

*Primary Examiner* — Freddie Kirkland, III
(74) *Attorney, Agent, or Firm* — Maginot, Moore & Beck LLP

(57) ABSTRACT

A measuring device for a fastening device includes a base body, a sensor unit configured to detect at least one fastening variable, and an interface connected to the sensor unit and configured to provide the detected at least one fastening variable to an external reading device. The interface is electrically connectable to a wireless communication unit or directly connectable to the external reading device.

15 Claims, 12 Drawing Sheets

(58) Field of Classification Search
CPC ...... H04Q 2209/84; H04Q 9/00; G01D 11/24; G01D 21/00; G01D 21/02
See application file for complete search history.

(56) References Cited

U.S. PATENT DOCUMENTS

| | | | |
|---|---|---|---|
| 10,941,802 B2* | 3/2021 | Zhu | G06K 19/07758 |
| 11,363,356 B2* | 6/2022 | White | G01D 11/30 |
| 2006/0225511 A1 | 10/2006 | Burmann | |
| 2013/0068031 A1* | 3/2013 | Mekid | F16B 31/02 73/761 |
| 2013/0186951 A1* | 7/2013 | Zhu | F16B 31/02 235/375 |
| 2013/0322984 A1* | 12/2013 | Bauchot | F16B 19/04 411/501 |
| 2014/0030041 A1* | 1/2014 | Bauchot | E05B 65/0089 411/166 |
| 2014/0129158 A1* | 5/2014 | Shea | G01L 1/142 702/57 |
| 2014/0345110 A1* | 11/2014 | Schmidt | F16B 29/00 411/21 |
| 2017/0016469 A1* | 1/2017 | Zhu | G06K 19/0775 |
| 2017/0175792 A1* | 6/2017 | Jaffrey | F16B 31/028 |
| 2018/0231047 A1 | 8/2018 | Tran et al. | |
| 2019/0226886 A1 | 7/2019 | Bromley | |
| 2019/0257114 A1* | 8/2019 | Hofmann | E05B 47/0038 |
| 2021/0355977 A1* | 11/2021 | Kederer | F16B 13/063 |
| 2023/0258520 A1* | 8/2023 | Jurisch | F16B 37/00 411/14 |
| 2024/0011519 A1* | 1/2024 | Delfini | H04Q 9/00 |

FOREIGN PATENT DOCUMENTS

| | | |
|---|---|---|
| CN | 101868634 A | 10/2010 |
| CN | 104718441 A | 6/2015 |
| CN | 104995414 A | 10/2015 |
| CN | 106840500 A | 6/2017 |
| DE | 101 38 261 A1 | 2/2003 |
| DE | 10 2010 042 263 A1 | 4/2012 |
| DE | 10 2012 201 293 A1 | 8/2013 |
| DE | 11 2013 001 695 T5 | 12/2014 |
| DE | 20 2018 100 923 U1 | 2/2019 |
| EP | 1 642 106 B1 | 12/2007 |
| GB | 1315702 A | 5/1973 |
| TW | 201809589 A | 3/2018 |
| WO | 2013/113586 A1 | 8/2013 |
| WO | 2017/203220 A1 | 11/2017 |

* cited by examiner

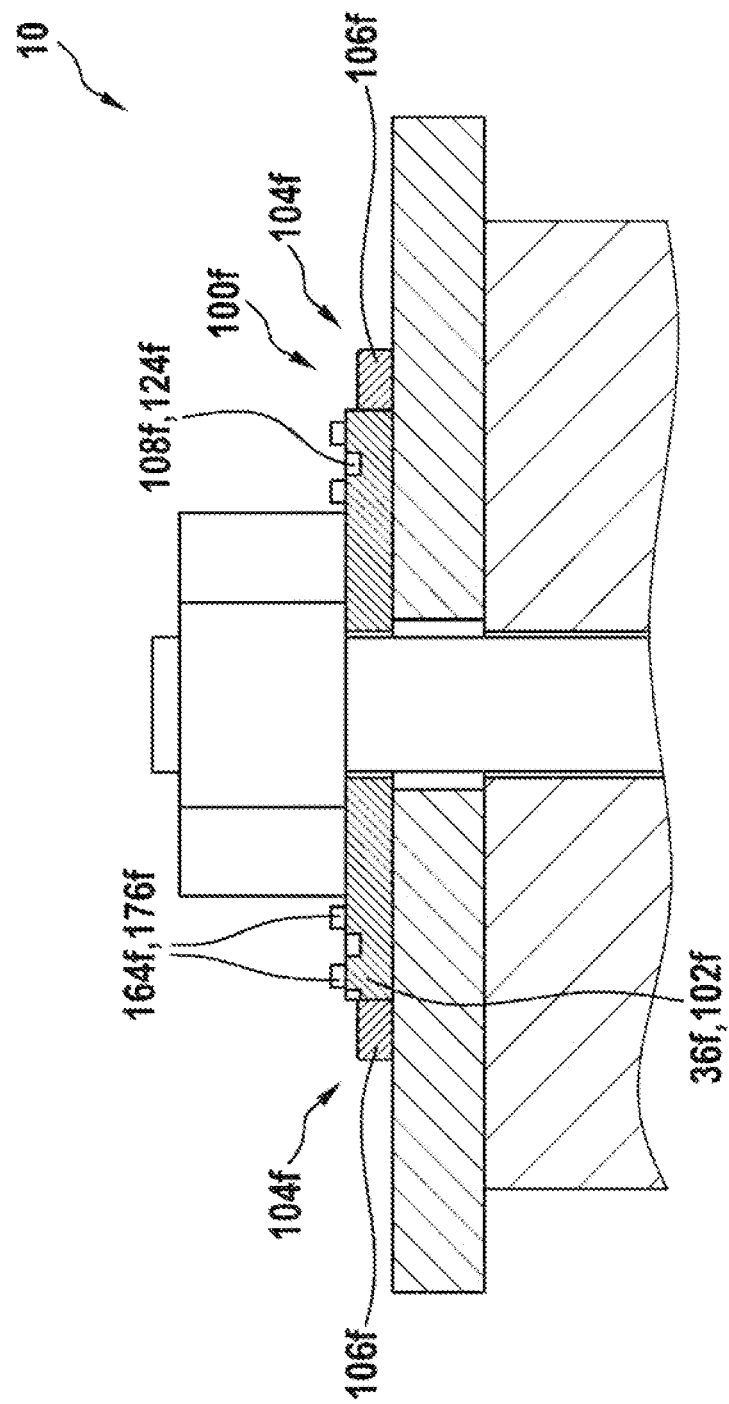

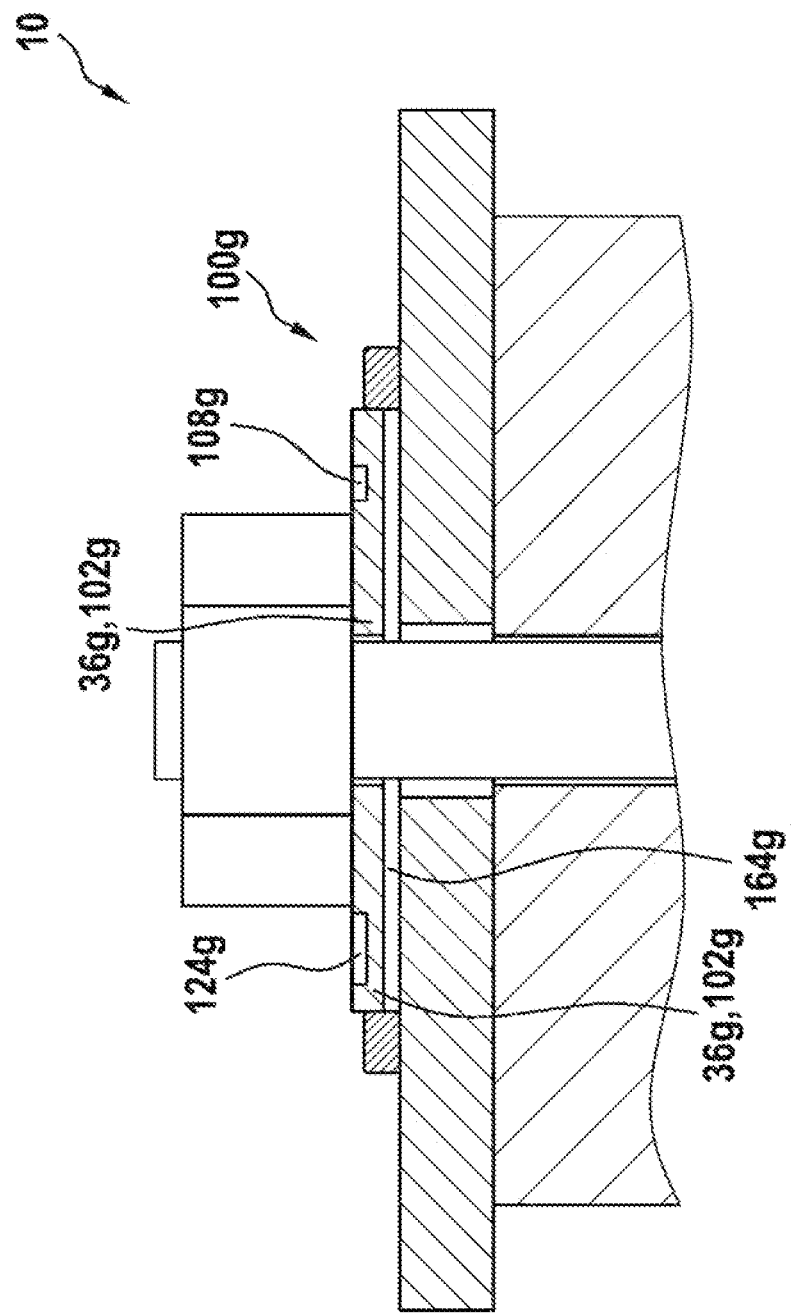

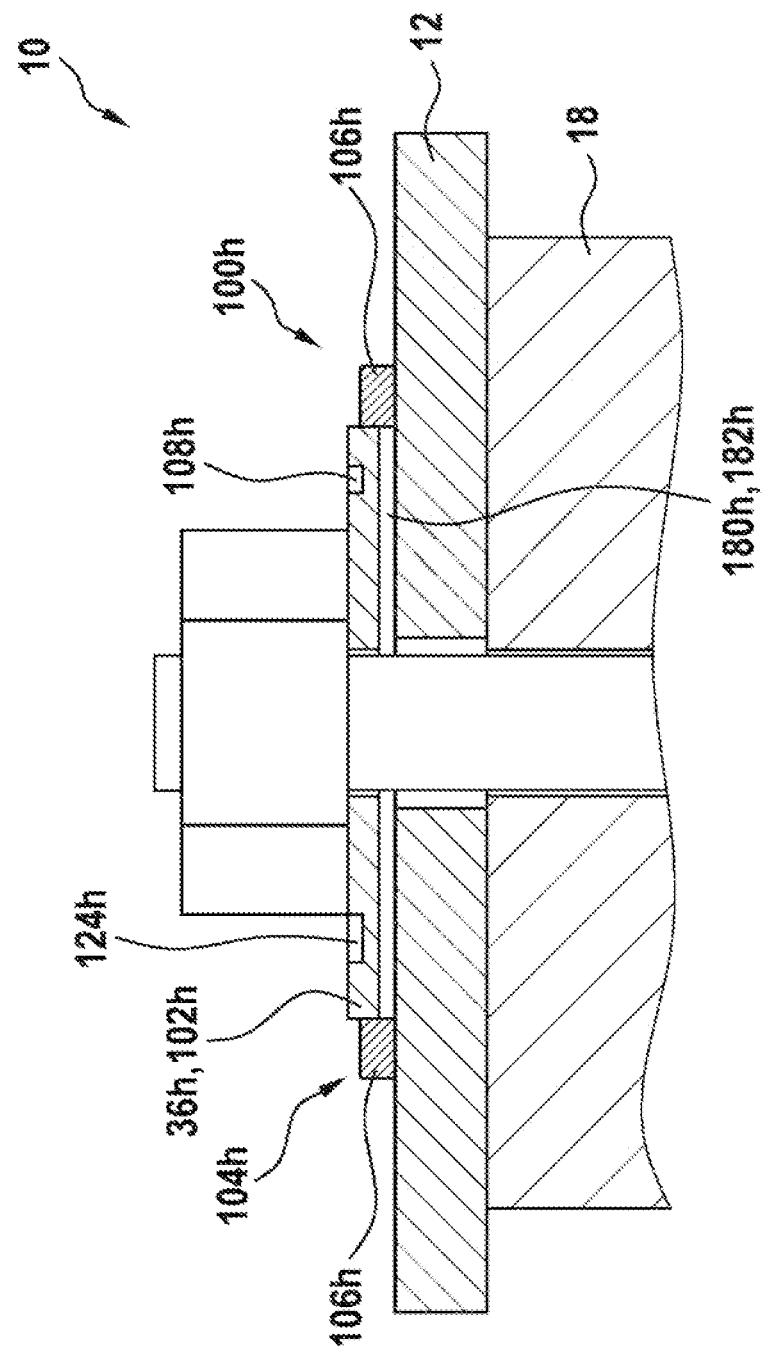

ANCHORING DEVICE

This application is a 35 U.S.C. § 371 National Stage Application of PCT/EP2020/070961, filed on Jul. 24, 2020, which claims the benefit of priority to Serial No. DE 10 2019 211 867.4, filed on Aug. 7, 2019 in Germany, the disclosures of which are incorporated herein by reference in their entirety.

BACKGROUND

WO 2013/113586 describes an anchoring system having a sensor for detecting an axial final position of an expanding sleeve.

SUMMARY

The disclosure relates to a measuring device for a fastening device, having a main body, a sensor unit, which is designed to detect at least one fastening quantity, and an interface, which is connected to the sensor unit and is designed to provide to an external reader device the at least one fastening quantity. It is proposed that the interface can be connected electrically to a wireless communication unit or can be connected directly to the external reader device. A simple and inexpensive measuring device can hence be provided, which can be retrofitted with costly electronics and/or communications. It is thereby advantageously possible to implement a particularly inexpensive measuring device that can be used to monitor the condition of a fastening device.

Said fastening device is in particular a fastening used in the construction industry, for instance an anchor, a wall plug or a bolt. An anchor shall be understood to mean in particular a component or an assembly of components for connecting or anchoring components securely under tension. The anchor preferably consists of a material of high tensile strength, preferably of a metal. The anchor can be fastened in a drilled hole.

In particular, the anchor can be connected frictionally and/or interlockingly to the material in which the drilled hole is located. Alternatively, it is also conceivable that the anchor can be integrally joined to the material in which the drilled hole is located. In particular, the drilled hole is in the form of a substantially cylindrical drilled hole.

The main body of the measuring device can be made of a plastic, a ceramic material and/or a metal. For example, the main body may be in the form of a plate that is annular in shape at least in parts or partially, a circuit board, a nut or a washer. In particular, the main body is designed such that the main body, in the fastened state, is located in a force path of the fastening device. In this case, the main body may be located partially or entirely in the force path of the fastening device. The force path of the fastening device shall be understood to mean here in particular the region in which acts, in the fastened state, a force originating from the fastening device. The main body preferably consists of a composite material.

The sensor unit can comprise one or more sensor elements for detecting the fastening quantities. The sensor elements can be in the form of passive sensor elements or active sensor elements.

An active sensor element shall be understood to mean here in particular a sensor that is designed in such a way that an electrical signal can be generated without electrical energy from outside. For example, the active sensor element may be in the form of a thermocouple, a light sensor, a photovoltaic cell or a pressure sensor, in particular a piezoelectric pressure sensor. For example, the active sensor element may be in the form of a piezoelectric or electrodynamic sensor element. Alternatively or additionally, the active sensor element is designed to generate a mechanical or electromagnetic excitation, where a response to this excitation can be converted into an electrical signal by the active sensor element. Unlike the passive sensor element, the active sensor element requires electrical energy from outside in order to generate the excitation. The active sensor element may be implemented, for example, as a piezoelectric layer, a sound transducer, a vibration element or even an electronic resonant circuit.

A passive sensor shall be understood to mean in particular a sensor whose parameter is altered by the measured quantity. The passive sensor is preferably designed such that the parameter can be altered by the measured quantity independently of an applied voltage or energy supply. The conversion into an electrical signal preferably takes place as soon as electrical energy is available. In particular, electronic circuitry can convert this parameter into an electrical signal. For example, the passive sensor can be in the form of an inductive, capacitive, resistive and optical sensor element, or in the form of a pressure sensor, force sensor, inertial sensor, light sensor, humidity sensor, temperature sensor or magnetic-field sensor, a thermocouple or a microphone.

The electronic circuitry can comprise, for example, an ASIC, an IC or integrated circuit, or a microprocessor. In addition, the sensor unit or the electronic circuitry can comprise a memory unit. In the memory unit can be stored the fastening quantity at least temporarily. In addition, identification information, which can be used to identify the fastening device, can be stored digitally in the memory unit. The identification information can comprise, for example, details about a type, model, or manufacturer, and/or a unique identifier.

The fastening quantities are in particular physical quantities that can characterize the condition of the fastening of the fastening device, the condition of the fastening device, and/or the condition of the material in which the fastening device is fitted. For example, the fastening quantity may be a force with which the fastening device is fitted, for instance in the case of an anchor the compressive force exerted on a nut. Alternatively or additionally, the fastening quantity may also be an orientation of the fastening device, for instance a tilt of the nut. It is also conceivable that the fastening quantity is information relating to the humidity and/or corrosion in the region of the fastening device or relating to a temperature. It is equally conceivable that the fastening quantity is information relating to the condition of the environment of the fastening device.

The interface can be in the form of a wireless interface or a contact interface. A wireless interface shall be understood to mean here in particular an interface via which the fastening quantity and/or the identification information can be transferred wirelessly. Said interface can be designed such that the data can be transferred, by means of Bluetooth, LoRaWAN, WLAN, ZigBee, NFC, Wibree or WiMAX, for example. In the connected state to the wireless communication unit, the interface is in the form of a wireless interface. A contact interface shall be understood to mean here in particular an interface via which data can be exchanged via a direct contact with the external reader device. The interface, in particular the contact interface, preferably comprises a contact element, which is designed to transfer data by means of an electrical conductor or an optical waveguide. The wireless communication unit can preferably be connected to the contact element of the interface. Advantageously, by connecting the wireless communication unit to the interface, an interface in the form of a contact interface can be converted into a wireless interface. The wireless communication unit may be in the form of an RFID tag or a SAW tag, for example.

The external reader device comprises a communication-interface, via which a signal provided by the interface can be received, and which, for example, can be in the form of a Bluetooth, LoRaWAN, WLAN, ZigBee, NFC, Wibree or WiMAX communication-interface. The external reader device may be in the form of an, in particular battery-powered, external reader device, for example. The external device may be in the form of a handheld power tool, for example, which is provided in particular for the purpose of producing the drilled hole or for fastening the fastening device, for instance an anchor. For example, the handheld power tool may be in the form of a drill, an impact drill, a hammer drill, a power driver, an impact wrench, or the like. It is also conceivable that the external reader device is an apparatus intended solely for reading the fastening device or the interface. It is equally conceivable that the external reader device is in the form of a smartphone, a tablet or a mobile computer such as a laptop for instance. Alternatively, it is also conceivable that the external reader device is in the form of an autonomous device, for instance a robot or a drone, which controls and reads the measuring device autonomously. Alternatively, it is conceivable that the external reader device is in the form of a stationary unit installed in the region of at least one fastening device, preferably in a region containing a plurality of fastening devices. By means of the external reader device in the form of a stationary unit, it is advantageously possible to check a plurality of fastening devices periodically by means of the interface in order to ensure that the anchoring is secure.

The information provided via the interface can be monitored and evaluated during and/or after the placement of the fastening device in order for this to be stored in infrastructure or written to the memory element. For example, during placement of a fastening device in the form of an anchor having a measuring device, this process can be monitored in particular by means of an external device in the form of a handheld power tool. Alternatively, the monitoring or the reading and evaluation can also be carried out at a distance of several meters by means of a mobile external reader device. For example, it is conceivable that the memory element is an RFID element and is intended to be modified and/or written to by tools or handheld power tools positioned close to the fastening device. The storage is achieved in this case, for example, by means of a physical modification to a resistance or a capacitance, which in turn can be read by the interface. The information provided via the interface can also be retrieved at a later point in time.

In addition, it is proposed that the sensor unit comprises a transforming element, which is designed to convert a physical input quantity into a physical output quantity, wherein the sensor element detects the fastening quantity on the basis of the physical output quantity. Advantageously, the transforming element can make the detection of the fastening quantity easier or even possible at all. The physical input quantity may be, for example, a force acting on the measuring device. It is equally conceivable that the physical input quantity is a temperature, a pressure or a humidity in the region of the measuring device. Depending on the transforming element, different output quantities are conceivable, for instance a force, an optical quantity, an electrical quantity, a magnetic quantity, etc. The transforming element may also be integral with the sensor element, and therefore the transforming element is additionally designed to detect the measured quantity.

It is also proposed that the transforming element is designed to be elastic such that the fastening quantity can be detected by way of a deformation of the transforming element. Advantageously, the transforming element can thereby easily convert a physical input quantity in the form of a force into, for instance, a force acting in another direction and/or into a thickness or length of the transforming element. The transforming element in particular has a modulus of elasticity of less than 10, especially of less than 2, preferably of less than 0.1. An elastic transforming element shall be understood to mean in particular an elastically deformable transforming element which, under the influence of a force, alters its shape, and returns to its original shape on this force influence being removed. Alternatively or additionally, the transforming element can also be designed to be capable of plastic deformation, wherein the threshold for the deformation is selected advantageously such that it is possible to detect or indicate a correct or incorrect fastening of the fastening device.

It is also proposed that the transforming element is designed such that at least one optical property of the transforming element varies according to the physical input quantity. Advantageously, the optical property can be detected by the sensor unit. The optical property may be, for example, the transparency, the refractive index, the reflectivity, the color, etc. of the transforming element.

In addition, it is proposed that the transforming element is designed such that at least one magnetic property varies according to the physical input quantity. Alternatively or additionally, it is proposed that the transforming element is designed such that at least one electrical property of the transforming element varies according to the physical input quantity. The magnetic properties may be, for example, a coupling quantity, a magnetic susceptibility, a magnetic permeability, a resultant change in the magnetic flux or in the flux transfer, an inductive attenuation level or a modified eddy-current behavior. The electrical properties may be, for example, a capacitance of a capacitor, in particular a capacitance of a plate capacitor, a dielectric permittivity, an electrical susceptibility, or an electrical resistance, in particular a contact resistance.

It is also proposed that the interface comprises at least one mechanical connecting element for frictional and/or interlocking connection to the wireless. Advantageously, the frictional and/or interlocking connection is designed such that it can be detached without tools. The interface can thereby advantageously be disconnected from the wireless communication unit in order to connect another measuring device to the wireless communication interface.

It is also proposed that the sensor unit and the interface are spaced in relation to each other, wherein the sensor element is arranged radially inside, and the interface is arranged radially outside. In particular, the sensor unit is located in a force path of the fastening device, and the communication unit is located outside the force path of the fastening device. This can advantageously reduce the load on the communication unit. Radially inside shall be understood to mean in this context in particular that, in the state fastened by the fastening device, transverse to the connecting direction, the distance of the sensor unit from the fastening device is less than the distance of the interface or of the wireless communication unit. The interface can be arranged on an upper face, a lower face or on an edge of the measuring device. An upper face of the measuring device shall be understood to mean here in particular the face which, in the fastened state, faces away from the workpiece on which the fastening device is fitted.

It is also proposed that the interface is connected to the sensor element via an electrical connecting element. The electrical connecting element may be in the form of a wire, a cable or a conductor track, for example. It is equally conceivable that the connecting element is in the form of a contact electrode, an annular electrode, an array of contacts, or a coil. The measuring device preferably comprises shielding, which is designed to shield the sensor element and/or the connecting element.

The shielding can comprise, for example, a shielding structure or a ground casing for electrodes. It is also conceivable that the shielding comprises at least one shielding ring. In this context, shielding shall be understood to mean in particular suitable shielding from electrical and/or magnetic fields. Advantageously, this can ensure that there is almost no, if any, distortion in the detection of fastening quantities that are obtained, for instance, by means of a capacitance.

It is also proposed that the measuring device comprises a reference structure for comparison with environmental parameters. This can advantageously increase the accuracy of the detection of the fastening quantity. The reference structure is preferably located outside the force path.

It is also proposed that the interface comprises at least two contact elements, which are each designed to provide at least one fastening quantity. Advantageously, it is thereby possible to provide a plurality of fastening quantities to the external reader device. The contact elements can have the same design but in particular are not connected to each other electrically. For example, the contact element may be in the form of an electrode, a male connector, a female connector, a contact pad, or the like.

The disclosure also relates to a system comprising a measuring device as described above, and comprising a wireless communication unit, wherein the wireless communication unit is integrally joined or frictionally and/or interlockingly connected to the measuring device. A measuring device which can communicate wirelessly with an external reader device can thereby be achieved advantageously.

In particular, the disclosure further relates to a measuring device for a fastening device, having a main body, a sensor unit, which is designed to detect at least one fastening quantity, and an interface, which is connected to the sensor unit and is designed to provide to an external reader device the at least one fastening quantity, wherein the sensor unit comprises an excitation element for mechanical and/or electrical excitation of the fastening device, and a sensor element, wherein the sensor element is designed to detect a fastening quantity according to the response to the excitation. It is thereby possible advantageously to introduce energy into the fastening device or its surroundings, and to measure the response thereto, wherein the condition of the fastening can be determined by way of the determined values. The excitation element may have a piezoelectric or electrodynamic design, for example. The excitation element may comprise an active sensor element and/or a passive sensor element. The excitation element is designed in particular to generate a mechanical or electromagnetic excitation, wherein a response to this excitation can be converted into an electrical signal by the sensor element. In particular, electronic circuitry can convert the response to the excitation into an electrical signal. The excitation element needs electrical energy to generate the excitation. The excitation element may be implemented, for example, as a piezoelectric layer, a sound transducer, a vibration element, or even an electronic resonant circuit. The excitation element and the sensor element can be formed as a single piece, in which case the sensor element is preferably in the form of an active sensor.

The excitation element is connected in particular to electronic circuitry. Said electronic circuitry may provide both the energy supply for the excitation element and the open-loop or closed-loop control of the excitation element. The open-loop or closed-loop control is performed here by means of an ASIC, a microcontroller, or the like.

Alternatively or additionally, it is equally conceivable that the measuring device is designed such that the excitation of the excitation element penetrates into the workpiece or the structure accommodating the fastening device.

It is also proposed that the excitation element is designed to generate a mechanical vibration. In particular, the mechanical vibration can be in the form of a sound wave. In this case, the mechanical vibration can be in the form of a longitudinal and/or transverse wave.

It is also proposed that the sensor unit is designed to detect the fastening quantity on the basis of the travel time, the intensity, the frequency and/or the direction of the mechanical vibration. Precise detection of the fastening quantity can thereby be achieved advantageously.

It is also proposed that the excitation element is in the form of a piezoelectric element. The excitation element in the form of a piezoelectric element is preferably integral with the sensor element.

In addition, it is proposed that the excitation element is designed to perform an electromagnetic excitation, wherein the sensor element detects a fastening quantity on the basis of an electrical impedance. In particular, the excitation element is in the form of a capacitor, the charge of which is transferred at different frequencies. For example, it is conceivable to detect by means of said excitation the humidity of the workpiece accommodating the fastening device.

In particular, the disclosure also relates to a system comprising a measuring device as described above, and a further measuring device, which are connected to each other wirelessly, wherein the further measuring device comprises a sensor element which is designed to detect a fastening quantity according to the response to the excitation of the excitation element of the measuring device. The further measuring device can be substantially identical to the measuring device.

The disclosure preferably relates to a method for monitoring the condition of a fastening device, comprising the following steps:

sending a signal from an external reader device to a measuring device which is fastened by a fastening device to a workpiece;

receiving the signal by the measuring device;

activating an excitation element of the measuring device according to the signal from the external reader device;

mechanically and/or electrically exciting the fastening device and/or the workpiece by the excitation element;

detecting by a sensor unit of the measuring device the response signal to the excitation by the excitation element. Advantageously, a fastening quantity can be detected by way of the response signal, and hence the condition of the fastening device and/or of the workpiece can be determined.

In addition, further steps are conceivable, for instance:

providing the response signal via an interface of the measuring device as described above;

evaluating the response signal by the measuring device or the external reader device;

receiving the response signal by the external reader device;

determining a condition of the fastening device and/or of the workpiece depending on the response signal;

indicating the condition of the fastening device and/or of the workpiece on the external reader device, in particular via a screen of the external reader device.

In particular, the disclosure also relates to a measuring device for a fastening device, having a main body, a sensor unit, which is designed to detect at least one fastening quantity, and an interface, which is connected to the sensor unit and is designed to provide to an external reader device the at least one fastening quantity, wherein the measuring device comprises an energy supply unit, which is designed to supply energy to a sensor element, an excitation element and/or a communication unit. It is thereby advantageously possible to supply the measuring device with energy.

It is also proposed that the energy supply unit comprises an energy receiving element, which is designed to convert an external electromagnetic signal for supplying energy to the measuring device. Advantageously, it is thereby easily possible to introduce energy into the measuring device. The external electromagnetic signal is provided by an external energy source, which is not part of the measuring device and/or fastening device. For example, the electromagnetic signal may be in the form of a radio wave or light, in particular light in the visible region or UV or IR light. The energy receiving element is designed in particular to convert the external electromagnetic signal into an electrical signal or into electrical energy. Further advantageous wavelength regions lie in bands that already have regulatory permission for sufficiently high radio powers, for instance in the bands for RFID, for radar or in generally available bands for communications.

It is also proposed that the energy supply unit comprises an energy storage element. This advantageously allows the energy to be stored or accumulated temporarily until the required amount of energy is reached for a measurement or a process such as communicating with an external reader device. For example, the energy storage element may be in the form of a capacitor, in particular a ceramic capacitor or a tantalum capacitor. Alternatively, it is also conceivable that the energy storage element is in the form of an electrochemical rechargeable battery, a supercapacitor or an electrolytic capacitor.

It is also proposed that the energy storage element has a capacitance of at least 5 to 500 µF, in particular at least 10 to 200 µF. This can advantageously ensure that the storage capacity of the energy storage element is sufficiently large.

In addition, it is proposed that the energy supply unit is designed such that the energy in the energy storage element is stored until a threshold value is reached, and on the threshold value being exceeded, the sensor element, the excitation element and/or the communication element is activated.

In particular, the disclosure also relates to a system consisting of a measuring device as described above and of an external energy supply device. The external energy supply unit may be integrated, for example in a building infrastructure unit such as a smoke alarm, for example. Advantageously, the measuring device can thereby be supplied with energy at regular intervals or as required. It is equally conceivable that the energy supply unit is in the form of a mobile external energy supply unit which can be carried by a user, for instance a smartphone or a torch. Alternatively, it is also conceivable that the external energy supply unit is in the form of an autonomous device, for instance a robot or a drone, which autonomously controls, and supplies with energy, the measuring device. Advantageously, the excitation or the electromagnetic radiation from the external energy supply means is optimized for the energy supply unit.

Preferably, the disclosure also relates to a method for controlling a measuring device for a fastening device, comprising the following steps:

activating an external energy supply unit; the activation can be triggered manually by a user or be performed automatically. The automatic activation can be time-triggered, for example.

providing energy in the form of an electromagnetic signal by an external energy supply unit; the external energy supply unit can be designed to be portable, autonomously mobile, or a stationary device. The external energy supply device may also be the external reader device.

converting the electromagnetic signal into electrical energy by means of the energy supply unit;

storing the energy by means of the energy supply unit;

controlling the measuring device on the basis of a status quantity of the energy supply unit; in particular, the status quantity of the energy supply unit is a fill level of the energy storage unit of the energy supply unit. Controlling the measuring device according to a status quantity of the energy supply unit can advantageously ensure a sufficient supply of energy to the measuring device during its activation.

providing the energy to a sensor element, an excitation element and/or a wireless communication unit;

activating the sensor element, the excitation element and/or the wireless communication unit.

Advantageously, all the electronic components of the measuring device can be supplied with energy by the energy supply unit. The individual steps of the method are preferably performed in the order specified above.

BRIEF DESCRIPTION OF THE DRAWINGS

The following description of the drawings reveals further advantages. The drawings, the description and the claims contain numerous features in combination. A person skilled in the art will expediently also consider the features individually and combine them to produce useful further combinations. Reference signs of features of different embodiments of the disclosure that are substantially the same are given the same number and a letter that identifies the embodiment.

In the drawings:

FIG. 1b shows a perspective view of the measuring device shown in FIG. 1a;

FIG. 1c shows a sectional view through the measuring device shown in FIG. 1a;

FIG. 7 shows a seventh embodiment of the measuring device;

FIG. 8 shows an eighth embodiment of the measuring device;

FIG. 9a shows a schematic view of a ninth embodiment of the measuring device;

FIG. 9b shows a schematic view of two measuring devices as shown in FIG. 9a.

DETAILED DESCRIPTION

Figure 1A:
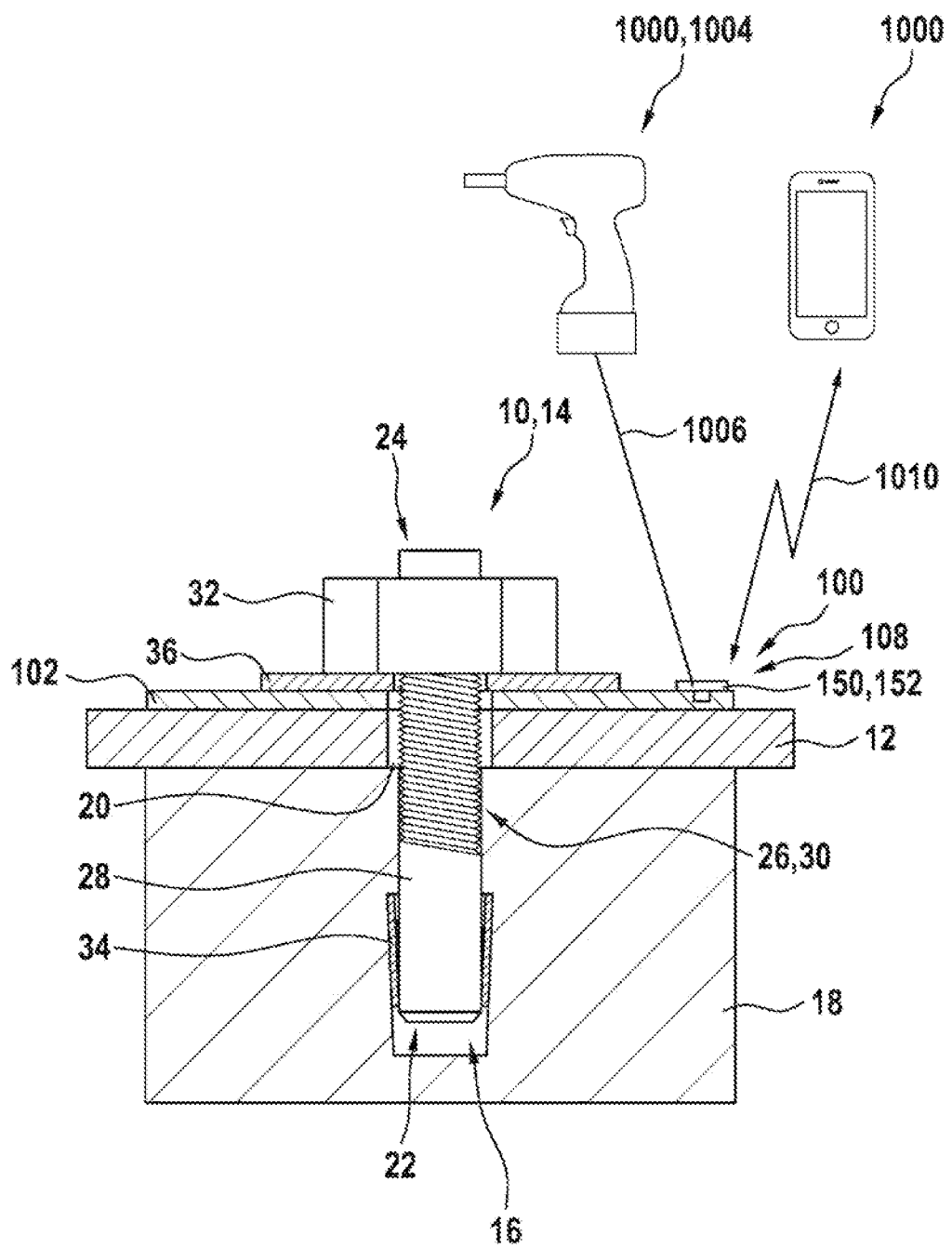
FIG. 1a shows a schematic side view of a first embodiment of a measuring device having a fastening device.

FIG. 1a shows a side view of a fastening device 10 having a measuring device 100. The fastening device 10 is designed in particular for fitting heavy-duty components 12 to walls or ceilings. The fastening device is an anchor by way of example. For this purpose, a drilled hole 16 is first produced in a workpiece 18 by means of a handheld power tool 1004 in the form of a hammer drill. The workpiece 18 is a concrete wall by way of example. The fastening device 10 consists of a metallic material, in particular high-grade steel.

For the purpose of fitting, the heavy-duty component 12 is first positioned on the wall. The fastening device 10 is introduced into the drilled hole 16 via a fitting-hole 20 in the heavy-duty component 12, so that a fastening region of the fastening device 10 is located inside the drilled hole 16. The fastening device 10 has a front end 22, which, in the fastened state, is positioned in the drilled hole 16. In addition, the fastening device 10 has a rear end 24, which is opposite the front end 22. In the fastened state, the rear end 24 is located in a region outside the drilled hole 16.

The fastening device 10 comprises a tensioning element 26, by means of which a tension can be introduced onto a main body 28 of the fastening device 10. The tensioning element 26 is in the form of a thread 30 or external thread by way of example. In this case, the tension is introduced by means of a nut 32, which is connected to the tensioning element 26. The fastening device 10 also comprises an expanding sleeve 34, which, when the fastening device 10 is fastened in the workpiece 18, secures said fastening device by means of a force acting radially outwards.

In addition, the fastening device 10 has a washer 36, which is likewise made of a metal or steel, for example. The washer 36 is designed to distribute a force originating from the fastening device 10 or the nut 32 over a larger area.

The measuring device 100 has a main body 102. The main body 102 is annular in shape and, for example, has a larger diameter than the washer 36. It is also conceivable, however, that the lateral extent of the main body 102 is less than that of the washer 36 or is matched thereto. Alternatively, it would be equally conceivable for the washer 36 and the main body 102 of the measuring device 100 to be formed as a single piece.

FIG. 1a shows the fastening device 10 in the fastened state, in which the fastening device 10 is located in the drilled hole 16. For the purpose of fastening, the fastening device 10 is first joined to a washer 36 and then to the measuring device 100.

In a further step, a nut 32 is connected to the fastening device 10. The nut 32 has an internal thread (not shown) which corresponds to the tensioning element 26, in the form of the thread 30, of the fastening device 10. Initially, the nut 32 is screwed onto the fastening device 10 until the nut 32 rests against the washer 36, and the washer 36 rests via the measuring device 100 against the heavy-duty component 12. Then a tool such as a wrench, or a handheld power tool 1004 such as a power drill, is used to transfer a torque to the nut 32, in which process the torque acting on the nut 32 is transformed by means of the tensioning element 26 into a tension acting on the fastening device 10.

The measuring device 100 is arranged in a force path of the fastening device 10 in order to detect a fastening quantity in the form of a force, in particular an initial tension.

Figure 1B:
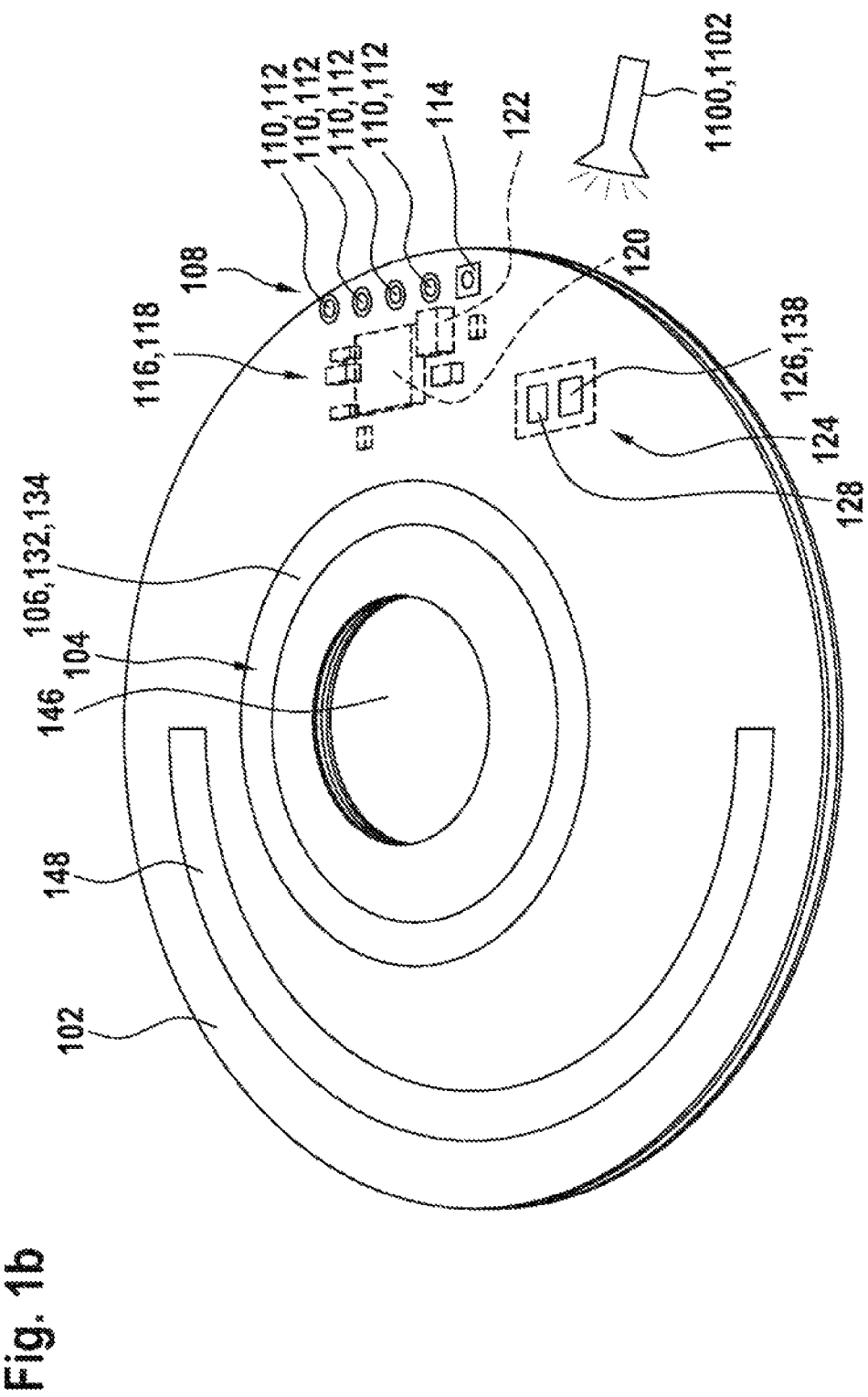

FIG. 1b shows a perspective view of the measuring device 100. The measuring device 100 comprises a sensor unit 104 for detecting the fastening quantity by means of at least one sensor element 106. The sensor unit 104 is connected to an interface 108. The interface 108 is designed to provide the fastening quantity detected by the sensor unit 104 to an external reader device 1000. The interface 108 is in the form of a contact interface by way of example. The interface 108 comprises four contact elements 110, which are arranged as contact surfaces 112 on an upper face of the measuring device 100. In the fastened state, the upper face of the measuring device 100 faces the bolt head or the nut 32 of the fastening device 10. The external reader device 1000 can make direct contact with the interface 108 or the contact elements 110 in order to exchange data or transfer the fastening quantities. The interface 108 optionally comprises also a further contact element 114, which is intended for connecting to ground.

The interface 108 is connected to the sensor unit 104 via a connecting element 116. The connecting element 116 is in the form of electronic circuitry 118 by way of example. The electronic circuitry 118 comprises an integrated circuit 120, which is connected to the sensor unit 104 and the interface 108. The electronic circuitry 118 also comprises a memory element 122, in which can be stored data, in particular the data or fastening quantities detected by the sensor unit 104. In the memory element 122 is additionally stored, for example, an ID of the measuring device 100 that can be used to identify/characterize the measuring device.

The electronic circuitry 118 is supplied with energy via an energy supply unit 124. The energy supply unit 124 is designed to supply energy to the sensor unit 104 or the sensor element 106. The energy supply unit 124 comprises an energy storage element 126 and an energy receiving element 128.

The energy receiving element 128 is designed to convert into electrical energy an external, in particular electromagnetic, signal for supplying energy to the measuring device 100. In the embodiment shown in FIG. 1b, the energy receiving element 128 is designed by way of example to convert an electromagnetic signal in the form of light. The energy receiving element 128 in particular is in the form of a solar cell 130, which uses the photovoltaic effect to convert the received light, for instance sunlight, into electrical energy. The energy receiving element 128 is arranged on the surface of the measuring device 100. The energy receiving element 128 has an area or surface area of at least 0.5 cm$^2$, in particular at least 1 cm$^2$, preferably in a range between cm$^2$ and 10 cm$^2$. Preferably, the size of the energy receiving element 128 is designed such that it equals at least 10%, especially at least 25%, preferably at least 50% of the area exposed when the fastening device is in the fastened state. In the embodiment shown, the exposed area is that part of the surface of the measuring device 100 that faces away from the heavy-duty component 12 and on which the fastening device 10 does not impinge by way of the nut 32. The energy receiving element 128 is preferably designed to have a power capability of at least 100 μW, especially at least 250 μW, preferably at least 1 mW. The energy storage element 126 can thereby advantageously be charged sufficiently in a few seconds to supply energy to the sensor unit 104 and/or the electronic circuitry 118.

By way of example, the energy storage element 126 is a capacitor in the form of a tantalum capacitor. Advantageously, the tantalum capacitor has a very high storage capacity for a small size as a result of its internal porous structure. The energy storage element 126 in particular has a capacity of at least 100 µF, preferably at least 0.5 mF, preferably several mF, in order to provide sufficiently high energy for performing measurements or communicating with the external reader device 1000. The energy supply unit 124 is designed by way of example such that the energy in the energy storage element 126 is stored until a threshold value is reached, whereat, on the threshold value being exceeded, the sensor element 106 is activated. The threshold value equals a capacitance value of 50 µF as an example. Alternatively, the threshold value can also be in the form of a voltage at the energy storage element, for instance 3.0 V.

The energy supply unit 124 is supplied with energy via an external energy supply unit 1100, for example. The external energy supply unit 1100 is, by way of example, a torch 1102 having a lens system in order to illuminate measuring devices 100 or fastening devices 10 even at a distance. Alternatively, it would also be conceivable for the external energy supply unit 1100 to be a floodlight. The electromagnetic radiation originating from the external energy supply unit 1100 is advantageously optimized to the solar cell 130 in use by matching the emitted wavelength.

Figure 1C:
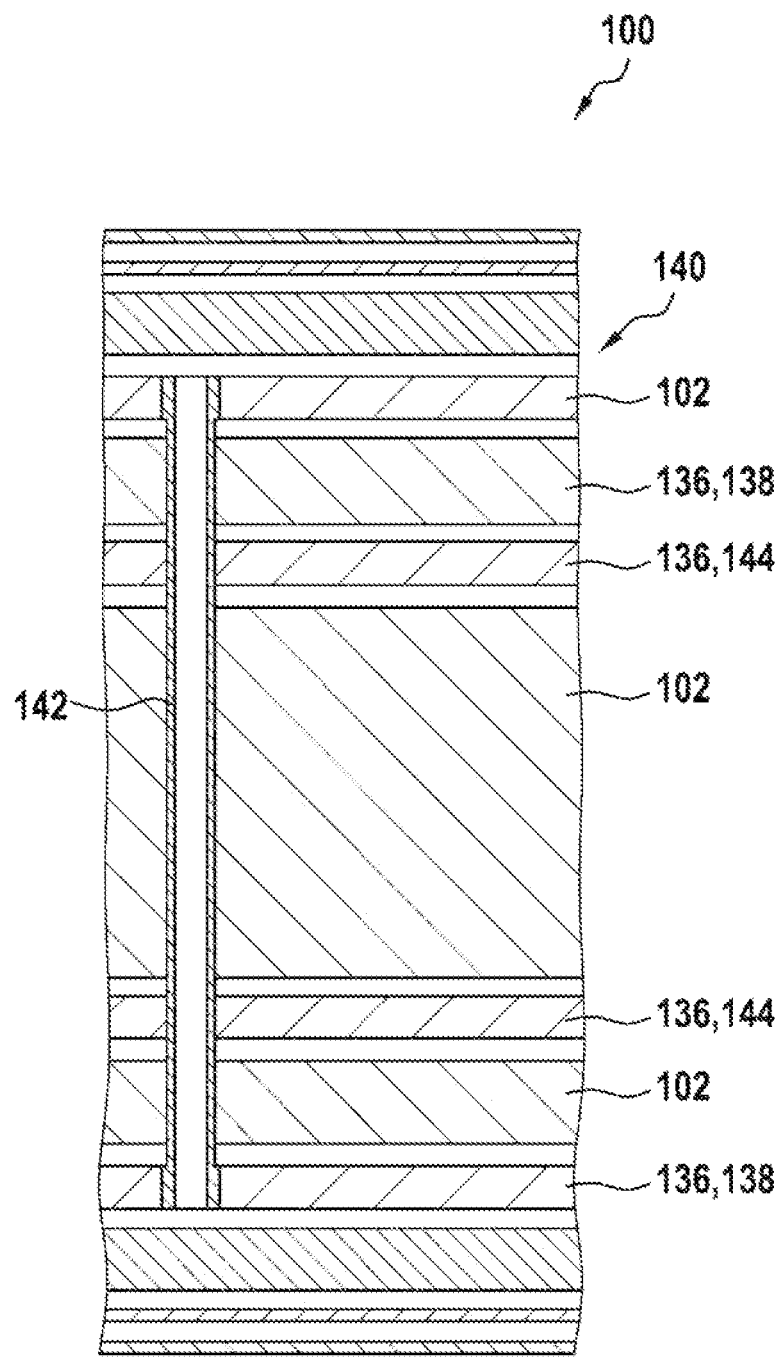

By way of example, the sensor element 106 of the sensor unit 104 is a passive sensor element 132. In particular, the sensor element 106 is in the form of a shielded capacitor 134 and is shown in a sectional view in FIG. 1c. The sensor element 106 comprises, by way of example, four electrically conductive planes 136, which are electrically isolated from one another by the main body 102 of the measuring device 100. For the purpose of electrical isolation, the main body 102 can comprise a ceramic structure, a reinforced plastic or a glass-fiber reinforced plastic in the regions between the conductive planes 136 by way of example. The conductive planes 136 preferably consist of a metal such as copper or a copper alloy. It is also conceivable that the conductive planes 136 consist of gold or a gold alloy. Shielding 140 is assigned to the two outer conductive planes 138. Advantageously, these outer planes 138 cover as large a percentage of the plane as possible, in particular at least 50%, preferably at least 75%, of the plane in order to provide effective shielding of the sensor element 106 from external interference factors such as electromagnetic radiation, for example. The two outer planes 138 in this case are connected to each other electrically via a shielding element 142, which preferably is arranged entirely along, or close to, the outer edge of the conductive planes 136. In addition, the outer planes 138 are connected to the ground contact 114.

The two inner conductive planes 144 form a parallel-plate capacitor. The conductive planes 136 of the parallel-plate capacitor are annular in shape and run in a circle about the central hole 146 in the measuring device 100. The inner planes 144 are preferably arranged entirely inside the shielding 140 in order to prevent interference in detecting the fastening quantity.

It is also conceivable that the sensor unit 104 comprises a plurality of sensor elements 106. For example, the sensor unit 104 could comprise three sensor elements, which are likewise in the form of parallel plate capacitors, and are distributed in an arc about the central aperture 146.

In addition, the sensor unit 104 comprises a reference structure 148. The reference structure 148 likewise consists of a parallel-plate capacitor, and is arranged entirely inside the shielding 140. The reference structure 148, unlike the sensor element 106, is arranged outside the direct force path, and therefore the reference structure, in the fastened state, is not located directly below the bolt head or the nut 32 of the fastening device 10.

The sensor element 106 and the reference structure 148 are connected each to one contact element 110 of the interface 108 in order to provide the detected fastening quantity to an external reader device 1000. By means of the electronic circuitry 118 and/or the external reader device 1000, it is possible to determine, for example, a fastening force on the basis of a difference in the two detected fastening quantities in the form of the capacitances. In addition, it is also possible that further influences such as, for instance, the temperature, the humidity, the ageing of the support material or of the workpiece, etc. are also determined via the detected fastening quantities.

In this embodiment, the capacitors, or the sensor element 106, and the reference structure 148 are read as soon as the energy supply unit 124 has stored enough energy, or a threshold value is exceeded. This process is controlled by means of the electronic circuitry 118, which is connected both to the energy supply unit 124 and the sensor unit 104. Alternatively or additionally, it is also conceivable that the reading of the capacitors takes place at predetermined time intervals, for instance once daily, weekly, monthly or annually. The detected values are preferably provided digitally via the interface 108.

The interface 108 in the form of a contact interface can be connected, for example, for the purpose of data transfer, to an external reader device 1000 in the form of a handheld power tool 1004. The connection is made here, for example, via a cable 1006, which can be connected directly to the contact elements 110 of the measuring device. The handheld power tool 1004 is in the form of a battery-powered drill, for example.

In addition, the interface 108 can be connected to an external communication unit 150. The external communication unit 150 is, by way of example, in the form of an RFID tag 152, and can be integrally joined to the measuring device 100 or the interface 108 for instance by adhesive bonding. In the connected state to the external communication unit 150, the detected fastening quantity can be provided by means of wireless communication 1010 to an external reader device 1000 such as a smartphone, for instance. In this process, the RFID tag can be tuned to suitable frequencies, for instance by the electronic circuitry 118, or the value of the fastening quantity can be read and converted into digital information. A clearly user-friendly system can thereby be achieved advantageously. The connection between the measuring device 100 and the external communication unit 150 is preferably designed to be detachable, in particular can be detached without tools. The external communication unit 150a is supplied with energy by means of the energy received by the energy supply unit 124.

Alternatively, it would be equally conceivable for the external communication unit 150 to be in the form of a SAW tag, which allows wireless communication by means of surface waves.

Figure 2:
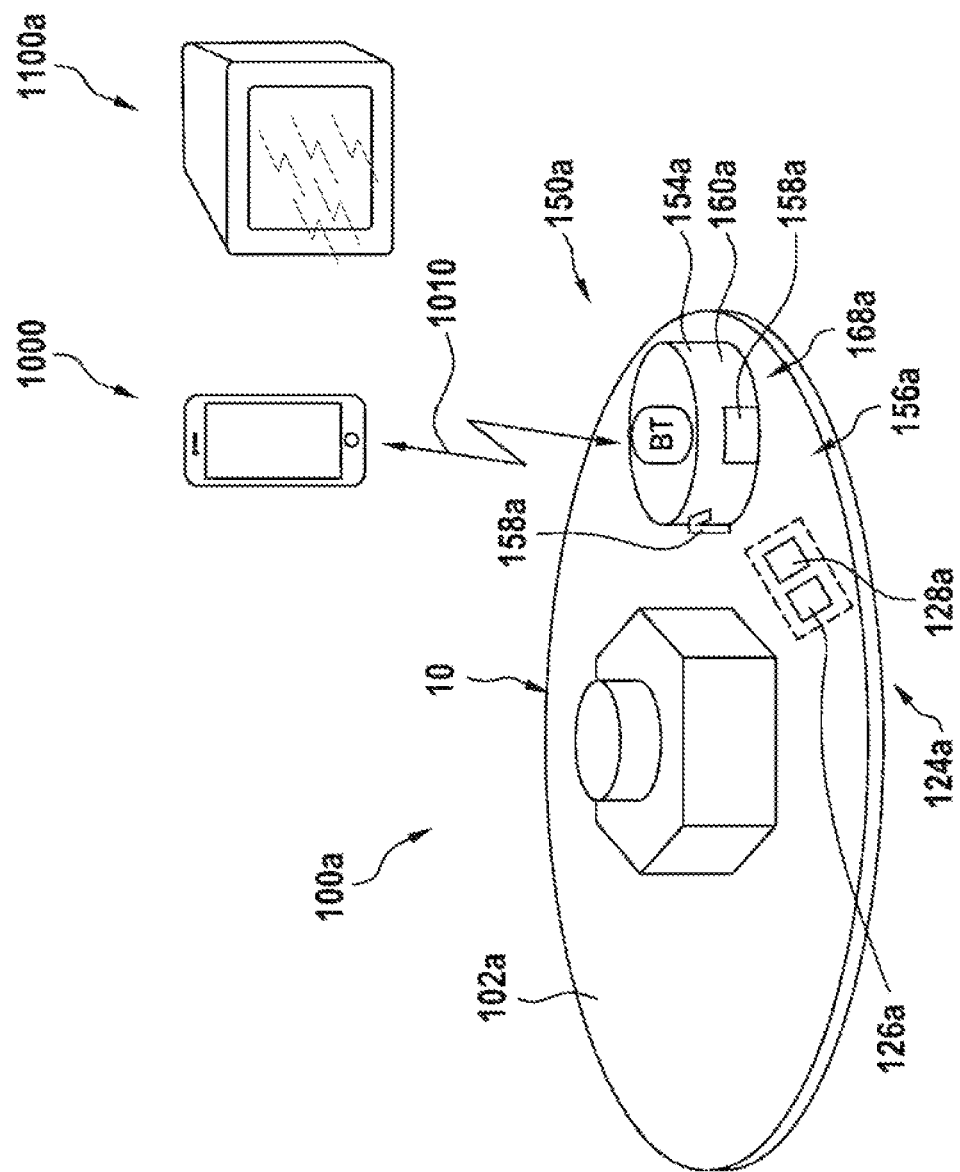
FIG. 2 shows an alternative embodiment of a measuring device.

FIG. 2 shows an alternative embodiment of the measuring device 100. The measuring device 100a substantially corresponds to the measuring device 100 described above, and differs in terms of the design of the interface 108a and the external communication unit 150a.

The interface 108a is in the form of a sensor node comprising suitable contacts for connecting to the external communication unit 150a, for instance in the form of a Bluetooth beacon 154a. The measuring device 100a has a mechanical interface 156a for connecting the external communication unit 150a to the measuring device 100a such that it can be detached without tools. The mechanical interface 156a is in part integral with the main body 102a of the measuring device 100a, and comprises a plurality of catches 158a, which are designed for frictional and interlocking connection to a housing 160a of the external communication unit 150a. The catches 158a engage in corresponding recesses (not shown) on the outside of the housing 160 of the external communication unit 150a. The Bluetooth module of the external communication unit 150a is arranged on a circuit board inside the housing 160 so that it is protected advantageously.

As in the previous exemplary embodiment, the external communication unit 150a is supplied with energy by means of the energy received by the energy supply unit 124a. As before, the energy supply unit 124a comprises an energy receiving element 128a and an energy storage element 126a.

The energy receiving element 124a is designed by way of example to convert an electromagnetic signal in the form of a radio wave. The energy receiving element 128a is arranged on the surface of the measuring device 100a. The external energy supply unit 1100a may here be in the form of an RFID transmitter or a GSM transmitter, for example.

Figure 3:
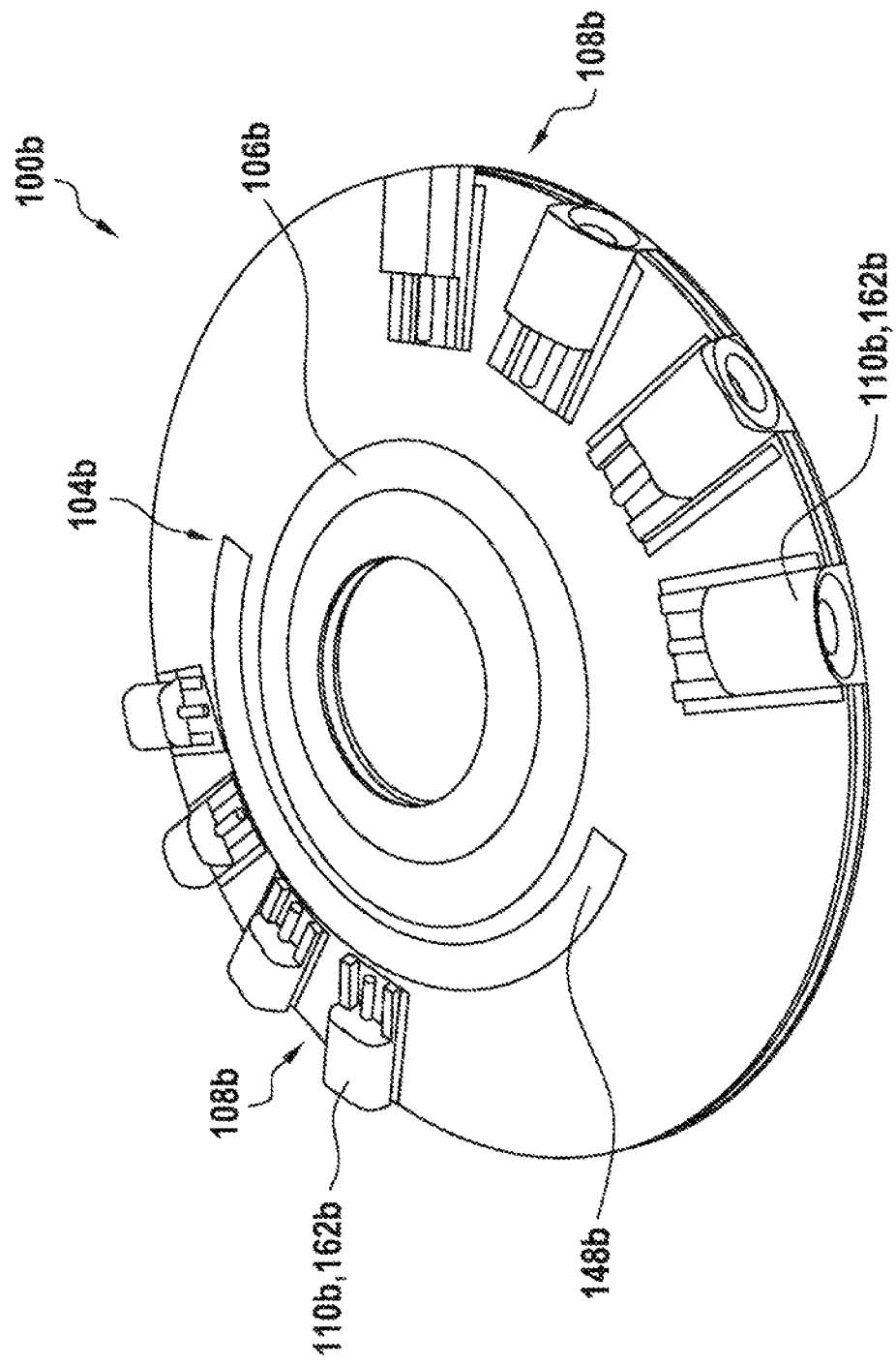
FIG. 3 shows a further alternative embodiment of the measuring device.

FIG. 3 shows a further alternative embodiment of the measuring device 100 in a perspective view. The measuring device 100b differs from the measuring device 100 described above in particular in terms of the design of the interface 108b. The interface 108b comprises two sets of four contact elements 110b in the form of plug-in receptacles 162b, which are connected to the sensor unit 104b. Four plug-in connectors 162b are connected to the sensor element 106b, and four plug-in connectors 162b are connected to the reference structure 148b. The plug-in connectors 162b are preferably in the form of MMCX (micro-miniature coaxial) plug-in connectors. The plug-in connectors 162b face outwards in order to achieve as compact a construction as possible for the measuring device 100b.

FIGS. 4 to 9b show further embodiments of the measuring device 100 in a schematic side view. The interfaces 108c to 108h are in each case in the form of a contact interface that can be connected to an external communication unit, which is not shown. In addition, all the measuring devices 100c to 100h comprise an optional energy supply unit 124c to 124h.

Figure 4:
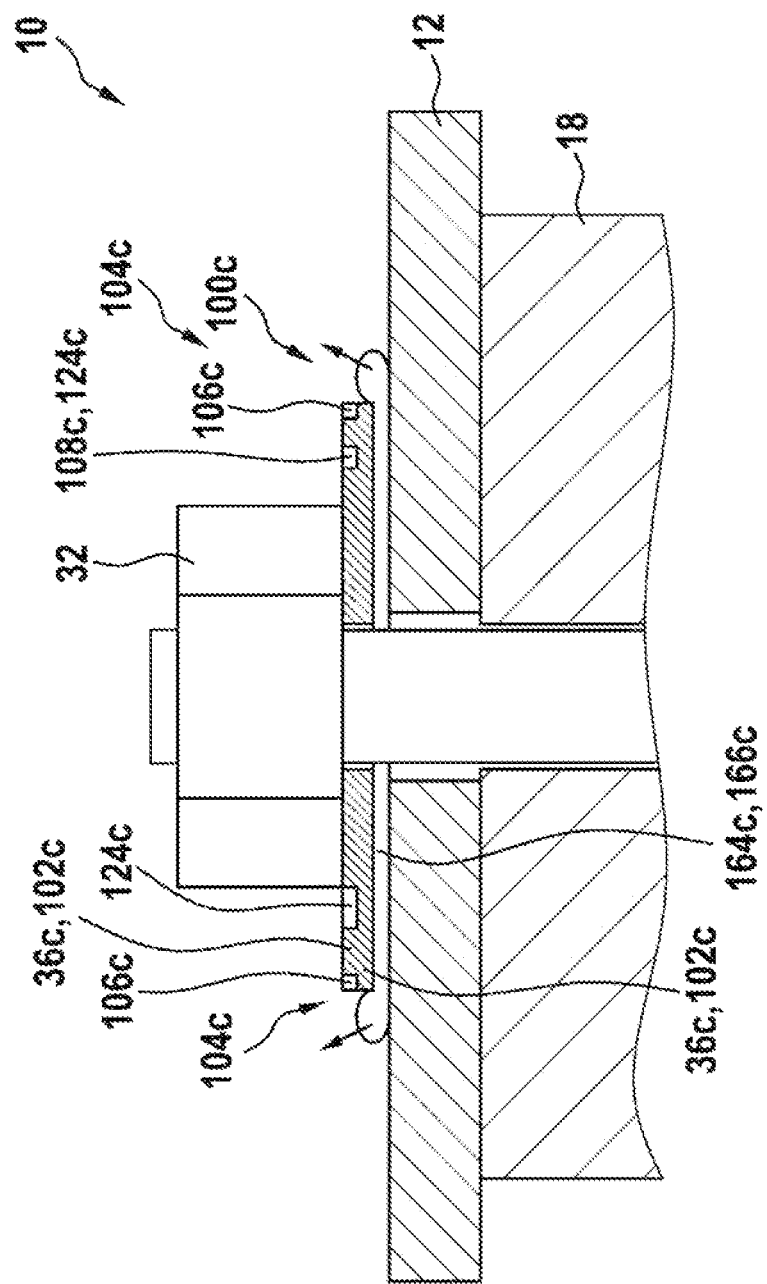
FIG. 4 shows a fourth embodiment of the measuring device.

The measuring device 100c shown in FIG. 4 comprises a main body 102c, which is integral with the washer 36c of the fastening device 10. The measuring device 100c comprises a transforming element 164c, which is designed to convert a physical input quantity in the form of a force which, in the fastened state, acts from the fastening device 10 onto the measuring device 100c, into a physical output quantity. By way of example, the transforming element 164c is in the form of an elastic element 166c having a rubber-like sleeve, which is filled with a fluid, in particular a viscous fluid. Alternatively, a fluid-filled balloon would also be conceivable. The elastic element 166c converts the physical input quantity into a physical output quantity in the form of a pressure and/or deformation or lengthening of the transforming element 164c. The physical output quantity is detected by the sensor unit 104c of the measuring device 100c, and provided as a fastening quantity to the interface 108c. As an example here, the sensor unit 104c is designed to detect the pressure. This can be achieved, for example, by the sensor unit 104c comprising a sensor element 106c in the form of a bridge circuit having four resistors, where the deflection or pressure in particular alters the value of only one or two of the resistors. Alternatively, the deformation could be detected, for example, by a sensor element 106c in the form of an optical sensor such as a camera.

Figure 5:
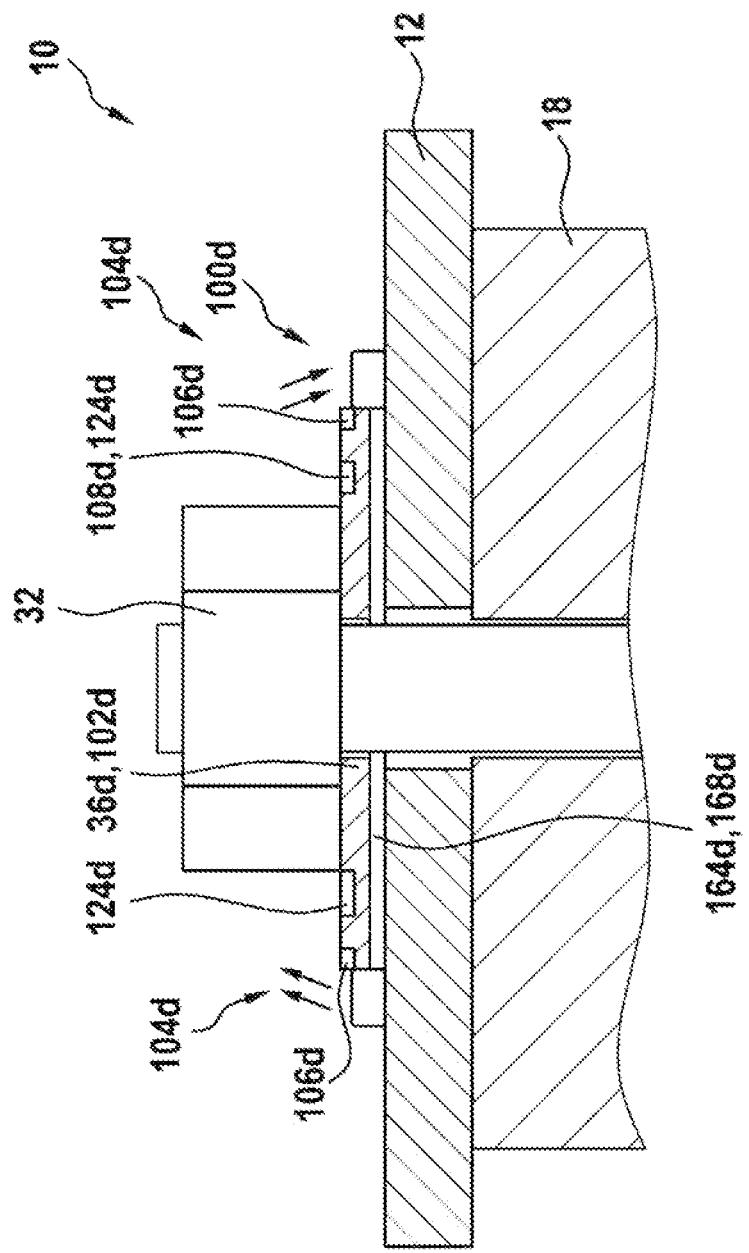
FIG. 5 shows a fifth embodiment of the measuring device.

The measuring device 100d shown in FIG. 5 comprises a main body 102d, which is integral with the washer 36d of the fastening device 10. The measuring device 100d comprises a transforming element 164d, which is designed to convert a physical input quantity in the form of a force which, in the fastened state, acts from the fastening device 10 onto the measuring device 100c, into a physical output quantity in the form of a light signal. By way of example, the transforming element 164d is in the form of a light-guiding layer 168d. Alternatively, a light guide embedded in a layer would also be conceivable. The light-guiding layer 168d converts the physical input quantity, or the compression caused, into a physical output quantity in the form of light transmission through the transforming element 164d. In particular, the light-guiding layer 168d is designed such that the light transmission through the transforming element 164d alters according to the applied force. The physical output quantity is detected by the sensor unit 104d of the measuring device 100d, and provided as a fastening quantity to the interface 108d. As an example here, the sensor unit 104d is designed to detect the light transmission. This can be achieved, for example, by the sensor unit 104d comprising a sensor element 106d in the form of an optical sensor such as a camera or a photodiode. In order to improve the measurement, a light signal can be introduced into the transparent transforming element 164d at one or more points by means of a light source (not shown).

Figure 6:
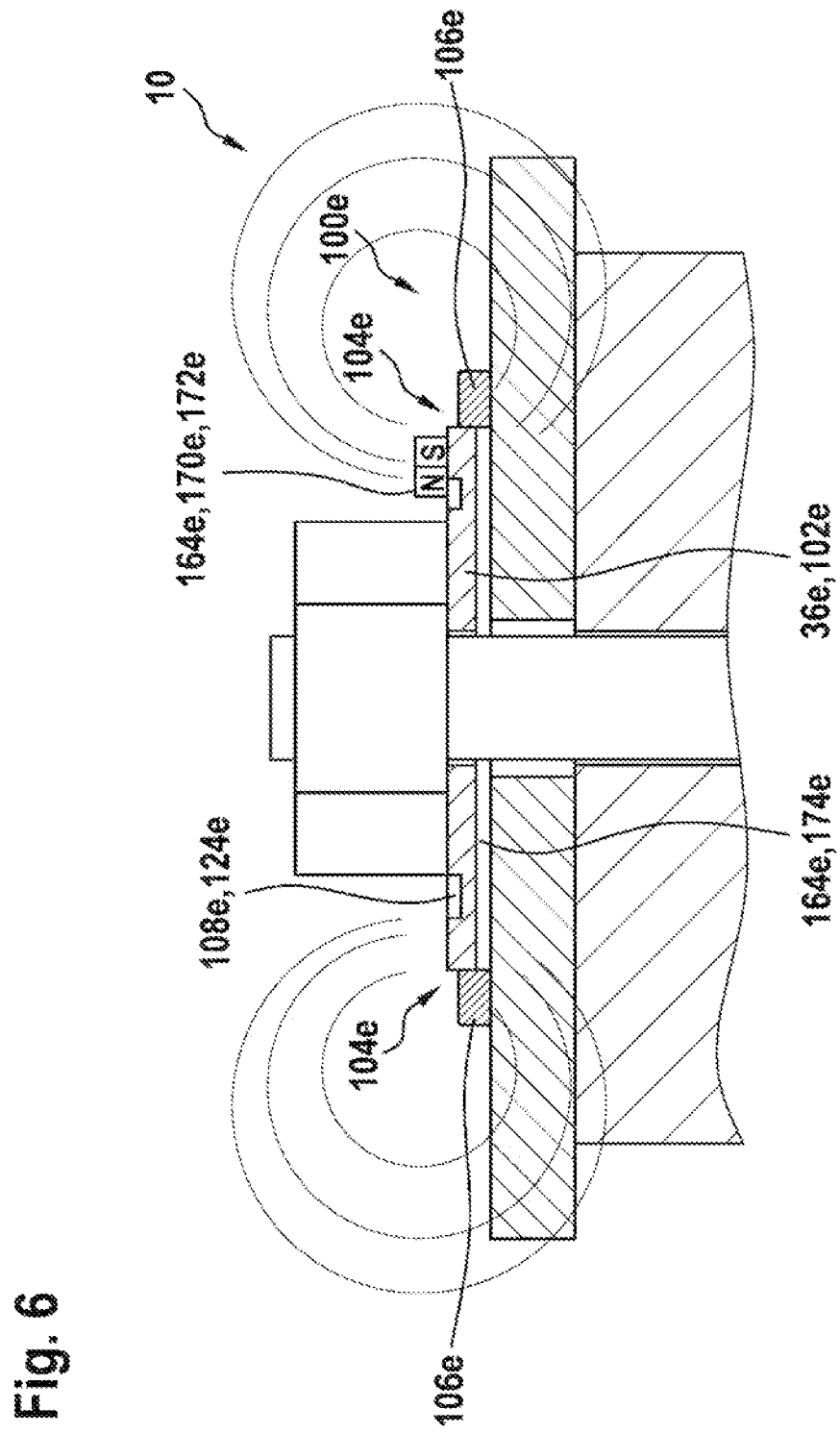
FIG. 6 shows a sixth embodiment of the measuring device.

The measuring device 100e shown in FIG. 6 comprises a main body 102e, which is integral with the washer 36e of the fastening device 10. The measuring device 100e comprises two transforming elements 164e, which are designed to convert a physical input quantity in the form of a force which, in the fastened state, acts from the fastening device 10 onto the measuring device 100e, into a physical output quantity in the form of a magnetic field. One of the transforming elements 164e is in the form of a magnetic element 170e for producing a magnetic field. For example, the magnetic element may be in the form of a permanent magnet 172e, as shown. Alternatively, it would also be conceivable for the magnetic element 170e to be in the form of an electromagnet or a coil. The transforming element 164e in the form of the magnetic element 170e is arranged such that the produced magnetic field at least partially, preferably entirely, overlaps the force path of the fastening device 10 and/or the further transforming element 164e, which is in the form of a layer 174e that affects and/or suppresses the magnetic field on the basis of the force acting on said layer. For example, the layer 174e may be in the form of a ferromagnetic layer whose field conductivity is dependent on the pressure. Alternatively, it would also be conceivable for the layer 174e to be in the form of a ferromagnetic "shape memory alloy", which for a predefined pressure alters its crystal configuration in such a way that at this threshold value and above, it switches from conducting a magnetic field to suppressing a magnetic field. Advantageously, both quantitative measurements and reliable qualitative measurements can be performed by means of the different layers 174e. The physical output quantity is detected by the sensor unit 104e of the measuring device 100e, and provided as a fastening quantity to the interface 108e. As an example here, the sensor unit 104e is designed to detect the magnetic field. This can be achieved, for example, by the sensor unit 104e comprising a sensor element 106e in the form of a magnetic-field sensor such as a Hall sensor. In order to improve the measurement, the sensor unit can comprise a plurality of Hall sensors.

The measuring device 100e shown in FIG. 7 comprises a main body 102f, which is integral with the washer 36f of the fastening device 10. The measuring device 100f comprises a transforming element 164f, which is designed to convert a physical input quantity in the form of a force which, in the fastened state, acts from the fastening device 10 onto the measuring device 100f, into a physical output quantity in the form of an eddy current or an inductance. The transforming element 164f is in the form of a coil 176f for inducing an eddy current in the fastening device 10. The response signal, and hence the physical output quantity, measured by the sensor unit 104f varies depending on the force coupling by the fastening device 10. The sensor element 106f can comprise the excitation coil 176f in this case. The force coupling by the fastening device 10 results from the forces acting between the individual parts, for instance the nut 32 and the measuring device 100f.

The measuring device 100g shown in FIG. 8 comprises a main body 102g, which is integral with the washer 36g of the fastening device 10. The measuring device 100g comprises a transforming element 164g, which is designed to convert a physical input quantity in the form of a force which, in the fastened state, acts from the fastening device 10 onto the measuring device 100g, into a physical output quantity. The sensor unit 104g comprises a sensor element 106g in the form of a passive sensor element. By way of example, the sensor element 106g is designed to detect a fastening quantity in the form of a force. The sensor element 106g can be a capacitor, for example, which detects the fastening quantity by means of a change in resistance. The transforming element 164g is in the form of an amplifying layer 176g, which is electrically conductive and uses suitable structures to amplify according to pressure a change in the resistance of the sensor element 106g. Alternatively, it would also be conceivable for the transforming element 164g or the amplifying element 176g to have a different design, given a different embodiment of the sensor unit 104g or of the sensor element 106g. For example, it would also be conceivable for the amplifying element 176g to amplify the change in a current according to the applied force.

The measuring device 100h shown in FIG. 9a comprises a main body 102h, which is integral with the washer 36h of the fastening device 10. As in the embodiments above, the measuring device 100h comprises a sensor unit 104h, an energy supply unit 124h and an interface 108h. In addition, the measuring device 100h or the sensor unit 104h comprises an excitation element 180h for mechanical and/or electrical excitation of the fastening device 10, and a sensor element 106h, which sensor element 106h is designed to detect a fastening quantity according to the response to the excitation. By way of example, the excitation element 180h is in the form of a piezoelectric element 182h. The excitation element 180h is preferably arranged on a side of the measuring device 100h, or of the washer 36h, that faces the component 12 to be fastened. The piezoelectric element 182h may be in the form of a layer or coating or a plate. By applying a voltage or alternating voltage, a force or vibration for exciting the fastening device 10, the heavy-duty component 12 and/or the workpiece 18 can be generated by the excitation element and coupled into the force path. The excitation element 180h can be at least in part integral with the sensor element 106h, so that the fastening quantity is detected at least in part by means of the piezoelectric element 182h. The capacitance can be measured simultaneously with the excitation, or the returning force can be detected offset in time, electrically as a current pulse, from which it is possible to make conclusions about the fastening system. Depending on the dynamic excitation, it is also possible to draw conclusions from the surrounding fastening matrix, for instance by means of resonances and/or reflections of mechanical vibrations.

Alternatively or additionally, it is also conceivable for the excitation element 180h to be designed to perform an impedance measurement. As an example here, the excitation element 180h can be designed as a capacitor, where the voltage in the capacitor is charge-transferred at different frequencies, and radiated into the fastening matrix or fastening device 10 and into the workpiece 18. A sensor element 106h detects a fastening quantity by way of the response, i.e. by way of the rates of the change transfer, for instance by means of a frequency shift or phase shift, of the system capacitor and surroundings. Conclusions can thereby be drawn about existing ions, cavities or even cracks in the surroundings.

Figure 9B:
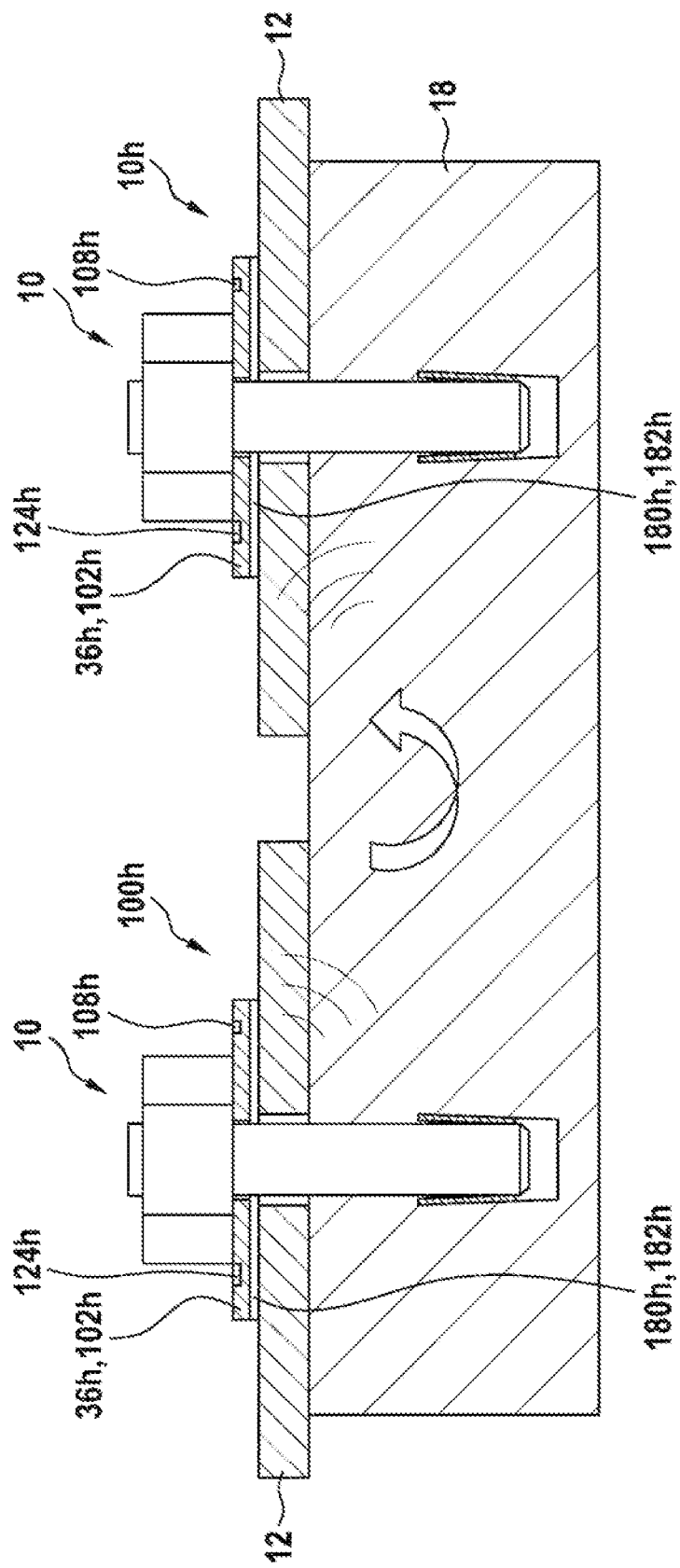

FIG. 9b shows in a schematic side view a system of two measuring devices 100h, which are each connected to a fastening device 10 for fastening a heavy-duty component 12. The excitation element 180h can additionally be used as an impact transducer or sound transducer. It is also conceivable that the excitation element 180h of the measuring device 100h is used for measuring the impedance of the further measuring device 100h. Advantageously, both measuring devices 100h or the interfaces 108h of the measuring devices 100h are each connected to an external communication unit as described above, so that the measuring devices 100h can communicate wirelessly with each other and exchange data with each other.

The invention claimed is:

1. A measuring device for a fastening device, comprising:
a main body;
a sensor unit configured to detect at least one fastening quantity, which includes a force;
an interface connected to the sensor unit and configured to provide to an external reader device the detected at least one fastening quantity; and
an elastic transforming element configured to convert a physical input quantity in the form of the force that acts on the fastening device in a fastened state into a physical output quantity, the elastic transforming element having a modulus of elasticity of less than 10 such that the elastic transforming element deforms from the force,
wherein the interface is electrically connectable to a wireless communication unit, or the interface is directly connected to the external reader device.

2. The measuring device as claimed in claim 1, wherein the sensor unit comprises a passive sensor element.

3. The measuring device as claimed in claim 2, wherein: the passive sensor element is configured to detect the at least one fastening quantity based on the physical output quantity.

4. The measuring device as claimed in claim 2, wherein: the sensor unit and the interface are spaced in relation to each other,
the passive sensor element is arranged radially inside, and the interface is arranged radially outside.

5. The measuring device as claimed in claim 2, wherein the interface is connected to the passive sensor element via an electrical connecting element.

6. The measuring device as claimed in claim 5, further comprising:

shielding configured to shield the passive sensor element and/or the electrical connecting element.

7. The measuring device as claimed in claim 1, wherein the interface comprises at least one mechanical connecting element for frictional and/or interlocking connection to the wireless communication unit.

8. The measuring device as claimed in claim 1, further comprising:
   a reference structure located outside a force path of the force and configured to detect at least one reference quantity for comparison with environmental parameters.

9. The measuring device as claimed in claim 1, wherein the interface comprises at least two contact elements, which are each configured to provide the at least one fastening quantity.

10. The measuring device as claimed in claim 1, wherein the main body includes an annular plate, a circuit board, a nut, or a washer.

11. A system comprising:
   the measuring device as claimed in claim 1; and
   the wireless communication unit to which the interface is electrically connected,
   wherein the wireless communication unit is integrally joined or frictionally and/or interlockingly connected to the measuring device.

12. A measuring device for a fastening device, comprising:
   a main body;
   a sensor unit configured to detect at least one fastening quantity; and
   an interface connected to the sensor unit and configured to provide to an external reader device the detected at least one fastening quantity,
   wherein:
   the interface is electrically connectable to a wireless communication unit, or the interface is directly connected to the external reader device,
   the sensor unit comprises a passive sensor element,
   the sensor unit comprises a transforming element configured to convert a physical input quantity into a physical output quantity,
   the passive sensor element is configured to detect the at least one fastening quantity based on the physical output quantity, and
   the transforming element is configured such that at least one optical property of the transforming element varies according to the physical input quantity.

13. The measuring device as claimed in claim 12, wherein the transforming element is elastic with a modulus of elasticity of less than 10, and that the at least one optical property is detected by way of a deformation of the transforming element.

14. A measuring device for a fastening device, comprising:
   a main body;
   a sensor unit configured to detect at least one fastening quantity; and
   an interface connected to the sensor unit and configured to provide to an external reader device the detected at least one fastening quantity,
   wherein:
   the interface is electrically connectable to a wireless communication unit, or the interface is directly connected to the external reader device,
   the sensor unit comprises a passive sensor element,
   the sensor unit comprises a transforming element configured to convert a physical input quantity into a physical output quantity,
   the passive sensor element is configured to detect the at least one fastening quantity based on the physical output quantity, and
   the transforming element is configured such that at least one magnetic property of the transforming element varies according to the physical input quantity.

15. The measuring device as claimed in claim 14, wherein the transforming element is configured such that at least one electrical property of the transforming element varies according to the physical input quantity.

* * * * *